3,507,838
DIENE RUBBER:MALEIC ANHYDRIDE ADDUCTS NEUTRALIZED WITH TERTIARY AMINES

Christiaan Vervloet, Delft, Netherlands, assignor to Shell Oil Company, New York, N.Y., a corporation of Delaware
No Drawing. Filed Jan. 16, 1968, Ser. No. 698,136
Claims priority, application Great Britain, May 2, 1967, 9,983/67
Int. Cl. C08f *1/90, 27/08*
U.S. Cl. 260—78.4                                    9 Claims

ABSTRACT OF THE DISCLOSURE

Elastomeric conjugated diene polymers having improved processability and reduced metal adhesion comprise diene rubbers adducted with 2–22% maleic anhydride and at least partially neutralized with a tertiary amine.

---

This invention is concerned with new elastomeric compositions and processes for their preparation. More particularly, the invention relates to elastomeric compositions comprising a maleic anhydride-synthetic rubber polymer, in which the bound maleic anhydride is partially or completely neutralized with tertiary amines.

Maleic anhydride-synthetic rubber polymers, having a bound maleic anhydride content of between 2 and 22% by weight are thermoplastic. At temperatures around 150° C. they can be processed, whereas at room temperature as well as higher temperatures, up to 100° C., they behave like vulcanized elastomers. These polymers readily bond to metals, glass and other polar surfaces and these bonding properties result in certain processing difficulties. To achieve easy processing, the adhesion to metal surfaces must be reduced.

In an effort to avoid adhesion to metal surfaces and so obtain easy processing of the polymers, at least partial neutralization of the bound maleic anhydride has been found to be necessary. At the same time, tensile strength and other physical properties of the polymer must be maintained.

Neutralization with alkali and alkaline-earth metal ions resulted in a reduced stickiness, but was found unsuccessful since immediate total coagulation of the polymer into a coherent gel took place. Also, after drying, the polymer was no longer processable; and at the processing temperature the neutralized polymer fell from the mill rolls in the form of crumbs and powder.

Similarly the use of mono- and poly-primary and secondary amines resulted in coagulation of the polymer into a coherent gel. In most cases, after drying the gelled mass, the polymer fell to crumbs on the rubber mill. When the higher homologues of mono-primary amines, e.g., palmitylamine and stearylamine, and some secondary amines, e.g., dibutylamine and dicyclohexylamine were used, banding on the mill was possible, but tensile strength values were low.

According to this invention elastomeric compositions are provided which comprise the reaction product of a conjugated diene synthetic rubber and maleic anhydride, having a bound maleic anhydride content of between 2 and 22% by weight, in which reaction product the maleic anhydride is partially or completely neutralized with one or more mono- and/or poly-tertiary amines.

By "conjugated diene synthetic rubber" is meant in the present specification and claims a synthetic elastomeric homopolymer of a conjugated diene hydrocarbon or copolymers comprising a conjugated diene hydrocarbon. As synthetic rubber in the present composition, any elastomeric homopolymer or copolymer of a conjugated diene can in principle be used. Examples are the elastomeric random and block copolymers of styrene and butadiene, and the stereo-specific rubbers cis 1,4-polybutadiene and cis 1,4-polyisoprene.

The maleic anhydride-synthetic rubber polymers, according to the invention, at temperatures up to about 100° C. possess high strength properties and behave like elastomeric vulcanizates when the bound maleic anhydride content is between 2 and 22% by weight; at temperatures around 150° C., the polymers are soft, free-flowing and easily processable. The preferred range for bound maleic anhydride content is from 7 to 18% by weight.

The tertiary amines used to partially or completely neutralize the bound maleic anhydride may be mono- and/or polyamines. Examples of mono-tertiary amines include triethylamine, tripropylamine and tributylamine. The poly-tertiary amines which may be used include tetramethylated ethylene diamine, penta-methylated diethylene triamine, imidazole derivatives, pyridine and quinoline derivatives and urea derivatives.

The bound maleic anhydride in the polymer may be partially or completely neutralized. The determination of bound maleic anhydride content may be carried out in a number of ways, one of the easiest being titration of the maleic anhydride adduct with sodium methylate, 1 mol. of sodium methylate neutralizing 1 mol. of maleic anhydride, forming the half-sodium salt, half-methyl ester. Other methods include a determination of the oxygen content of the polyisoprene-maleic anhydride polymer. When only 10% equivalent of the bound maleic anhydride is neutralized, the polymer has improved processability, but it is preferred to neutralize at least about 50% equivalent of more of the bound maleic anhydride the maximum processability being obtained when the bound maleic anhydride is completely neutralized.

The elastomeric compositions according to the invention may be prepared by a solution process. In this process the synthetic rubber, e.g., polyisoprene, is dissolved in a suitable solvent. Preferred solvents are, for example, methyl-isobutyl ketone and methyl-ethyl ketone for polyisoprene and xylene for polybutadiene. A suitable stabilizer may be added, and when polyisoprene is used 2,6-di-tertiary-4-methylphenol and a polymerized quinoline derivative, Flectol H, have been found to be effective. Maleic anhydride, dissolved in a suitable solvent is then added and the solution heated to 100° C. When the process is carried out using polybutadiene, thiophenol and a complexing agent for iron, e.g., anhydrous citric acid, may be added. A radical initiator is then added slowly and the reaction allowed to proceed. Paramethane hydroperoxide, benzoyl peroxide, diazo-amino-benzene and azo-bis-isobutyronitrile are suitable radical initiators. To precipitate the synthetic rubber-maleic anhydride adduct, the solution is cooled to room temperature and ethanol is added. The precipitate may be dried in vacuo.

The bound maleic anhydride content of the adduct may be determined after being dissolved in a suitable solvent, e.g., benzene, by titration with sodium methylate. Partial or complete neutralization of the bound maleic anhydride may be effected by addition to the polymer solution, of a solution of the desired mono- and/or poly-tertiary amine. Solvent may then be removed by distillation in vacuo and the product dried.

Alternatively, the maleic anhydride-synthetic rubber adduct may be prepared in a solid phase reaction at high temperature. The adduct obtained by this method may be dissolved in a suitable solvent and the bound maleic anhydride neutralized by the addition of a mono- and/or poly-tertiary amine.

The resultant partially or completely neutralized maleinized rubbers can be processed as thermoplastic ma-

EXAMPLE I

Polyisoprene rubber was slightly masticated on a rubber mill, cut into small pieces and dissolved at room temperature with vigorous stirring in methyl-isobutyl ketone to give a solution containing from 3 to 5% by weight of the polymer; 1 part by weight per hundred rubber (hereinafter referred to as phr.), 2,6-ditertiary-4-methyl phenol and 1 phr. Flectol-H, a polymerized quinoline derivative, were added as stabilizers. 20 phr. maleic anhydride were dissolved in methyl-isobutyl ketone as a 20% by weight solution and added to the polymer solution. The solution was then heated to 110° C., while bubbling a slow stream of nitrogen.

5 phr. of azo-bis-isobutyronitrile were dissolved in methyl-isobutyl ketone as a 2% by weight solution in a dropping funnel and added dropwise to the polymer solution over 2 hours. The reaction was allowed to proceed for a further hour at 110° C. The polymer solution was then cooled to room temperature.

1 phr. 2,6-ditertiary-4-methyl phenol with an equal volume of ethanol was added to the polymer solution with stirring over a few hours to precipitate the polyisoprene-maleic anhydride adduct. This precipitate was dried in vacuo at room temperature.

The dried polyisoprene-maleic anhydride adduct was dissolved in benzene with stirring at room temperature at a concentration of 10% weight per volume. The bound maleic anhydride content was determined by titration with sodium methylate, in which titration 1 mol. of sodium methylate neutralized 1 mol. of maleic anhydride, forming the half-sodium salt, half methyl ester. The bound maleic anhydride content was found to be 7.5% by weight of the adduct.

14.2 g. tetramethylated ethylene diamine per 100 g. of adduct dissolved in methyl ethyl ketone as a 10% by weight solution were added to the polymer solution to completely neutralize the bound maleic anhydride. The solvent was distilled in vacuo and the final product thoroughly dried. The amount of adduct obtained was found to be 108 phr.

EXAMPLE II

The procedure described in Example I was repeated using a solution of 7.1 g. of tetramethylated ethylene diamine per 100 g. of adduct dissolved in methyl ethyl ketone and this 10% by weight solution added to the polymer solution to neutralize only 50% of the bound maleic anhydride.

EXAMPLE III

The procedure described in Example I was repeated using 10 phr. of maleic anhydride, to give a polyisoprene-maleic anhydride adduct having 4.2% by weight of bound maleic anhydride. This adduct was neutralized using 1 mol. of tri-butylamine per 1 mol. of bound maleic anhydride to give a 50% neutralization of the maleic anhydride on a stoichiometric equivalent basis.

EXAMPLE IV

The procedure described in Example I was repeated using 40 phr. of maleic anhydride, to give a polyisoprene-maleic anhydride adduct having 13.2% by weight of bound maleic anhydride. This adduct was neutralized with triethylamine to give a 50% neutralization of the maleic anhydride on a stoichiometric equivalent basis.

EXAMPLE V

The procedure described in Example I was repeated using 70 phr. of maleic anhydride to give a polyisoprene-maleic anhydride adduct having 17.4% of bound maleic anhydride. This adduct was 50% equivalents neutralized with quinoline.

EXAMPLE VI

The tensile properties of partially and completely neutralized maleic anhydride-polyisoprene adducts were determined on the Instron tester with the ASTM dumbells die D as described in ASTM, D 412. These properties are shown in the table where M 300, TS, and Eb represent the stress at 300% elongation, tensile strength and the elongation at break, respectively. The properties of the partially and completely neutralized adduct are compared with those of the unneutralized maleic anhydride-polyisoprene rubber, polyisoprene pure gum and natural rubber pure gum vulcanizates.

Tensile properties as determined at 70° C. and 20° C. are shown in Tables I and II.

TABLE I

| Polymer | Properties at 70° C. | | |
|---|---|---|---|
| | 300% modulus (kg./cm.$^2$) | Tensile strength (kg./cm.) | Elongation at break, percent |
| Adduct containing 7-10% weight maleic anhydride, 50% neutralized | 30 | 40 | 500 |
| Adduct containing 7-10% weight maleic anhydride, totally neutralized | 30 | 40 | 500 |
| Adduct containing 7-10% weight maleic anhydride, unneutralized | 7 | 15 | 600 |
| Adduct containing 4.2% weight maleic anhydride, 50% neutralized | 6 | 10 | 750 |
| Adduct containing 17.4% weight maleic anhydride, unneutralized | 60 | 75 | 350 |
| Polyisoprene pure gum vulcanizate | | 10 | 300 |
| Natural rubber pure gum vulcanizate | 18 | 150 | 800 |

TABLE II

| Polymer | Properties at 20° C. | | |
|---|---|---|---|
| | 300% modulus (kg./cm.$^2$) | Tensile strength (kg./cm.) | Elongation at break, percent |
| Adduct containing 7-10% weight maleic anhydride, 50% neutralized | 25-30 | 280 | 850 |
| Adduct containing 7-10% weight maleic anhydride, totally neutralized | 25-30 | 280 | 850 |
| Adduct containing 7-10% weight maleic anhydride, unneutralized | | 160 | |
| Adduct containing 4.2% weight maleic anhydride, 50% neutralized | 10 | 100 | 1000 |
| Adduct containing 4.2% weight maleic anhydride, unneutralized | | 70 | |
| Adduct containing 17.4% weight maleic anhydride, 50% neutralized | 50 | 180 | 750 |
| Adduct containing 17.4% weight maleic anhydride, unneutralized | | 120 | |
| Polyisoprene pure gum vulcanizate | 15 | 260 | 1000 |
| Natural rubber pure gum vulcanizate | 25 | 300 | 800 |

It is seen from the results in Tables I and II that at both 20° C. and at 70° C. the neutralized adducts reach appreciably higher tensile strength values than those found for the unneutralized adducts. At 7 to 10% weight of bound maleic anhydride an otimum tensile strength level is reached at 20° C. Below 7 to 10% weight of bound maleic anhydride the tensile strength gradually increases with increasing bound maleic anhydride content, whereas above 7 to 10% weight of bound maleic anhydride a decrease in tensile strength was found, the adducts become gradually tougher and more plastic the higher the bound maleic anhydride content.

At the optimum level at 20° C. the tenile strengths of the adducts, and also the elongations at break reach values between those of the pure gum vulcanizates of polyisoprene and of natural rubber.

The stresses at 300% elongation at the optimum level are higher than is normally found for the polyisoprene pure gum vulcanizates and equal to the value for natural rubber pure gum vulcanizates.

At 70° C. it is seen that although the tensile strength of the neutralized adduct is much lower than that of the natural rubber pure gum vulcanizate, it is considerably higher than that of polyisoprene pure gum vulcanizate, at the optimum level of bound maleic anhydride content and above. At the optimum level, the adduct is seen to be appreciably tougher (300% modulus) than the natural rubber pure gum vulcanizate.

From the dynamic measurements, performed over a range of temperatures it was found that:

(1) the elastic modulus of the optimum adduct only slightly decreases from 0° C. up to 100° C. (from a value of 4 kg./cm.² down to 2.2 kg./cm.²) and always remains higher than the value found for polyisoprene pure gum vulcanizate (0.4 kg./cm.²);

(2) from dynamic losses it was seen that the second order transition temperature of the optimum adduct of −30° C. was identical with that of the polyisoprene pure gum vulcanizate. (The second order transition temperature is that temperature at which the adduct looses its elastic properties and gradually stiffens to a tough plastic.)

EXAMPLE VII 100 g. of polybutadiene rubber were dissolved in 3 liters of xylene. 70 phr. of maleic anhydride were added to the polybutadiene solution, with 1.0 phr. of thiophenol and 0.5 to 1.0 phr. of anhydrous citric acid. The solution was then heated to 130° C., while bubbling a slow stream of nitrogen.

5 phr. of paramethane hydroperoxide, dissolved in 300 ml. of xylene, were added dropwise over 2 hours. The reaction was allowed to proceed for a further hour at 130° C. The polymer solution was then cooled to room temperature.

Ethanol was added to precipitate the polybutadiene-maleic anhydride adduct. The precipitated adduct was purified from excess maleic anhydride by redissolving in benzene and reprecipitation with ethanol. The purified product was dried in vacuo at room temperature.

The amount of bound maleic anhydride was determined and found to be 6.0% weight.

Part of this product was neutralized by adding per 100 g. of the product dissolved in benzene, 7.0 g. of tetramethyl-ethylene diamine. The solvent was distilled in vacuo and the final product thoroughly dried.

EXAMPLE VIII

The procedure described in Example VII was repeated using 75 phr. of thiophenol, giving an adduct with 8.0% weight of bound maleic anhydride. Part of this product was neutralized by adding, per 100 g. of product dissolved in benzene, 9.3 g. of tetramethyl-ethylene diamine.

EXAMPLE IX

The tensile properties of neutralized and unneutralized maleic anhydride-polybutadiene adducts were determined according to the methods described in Example VI. The results are shown in Tables III and IV.

TABLE III

| Polymer | Properties at 20° C. | | |
| --- | --- | --- | --- |
| | 300% modulus (kg./cm.²) | Tensile strength (kg./cm.) | Elongation at break, percent |
| Adduct containing 6.0% weight maleic anhydride, neutralized | 60 | | 900 |
| Adduct containing 6% weight maleic anhydride, unneutralized | | 35 | 800 |
| Adduct containing 8% weight maleic anhydride, neutralized | 35 | 150 | 900 |
| Adduct containing 8% weight maleic anhydride, unneutralized | | 70 | 800 |

TABLE IV

| Polymer | Properties at 20° C. | | |
| --- | --- | --- | --- |
| | 300% modulus (kg./cm.²) | Tensile strength (kg./cm.) | Elongation at break, percent |
| Adduct containing 6% weight maleic anhydride, neutralized | | 75 | 900 |
| Adduct containing 6% weight maleic anhydride, unneutralized | 17 | 40 | 850 |
| Adduct containing 8% weight maleic anhydride, neutralized | 42 | 150 | 850 |
| Adduct containing 8% weight maleic anhydride, unneutralized | 24 | 75 | 800 |

I claim as my invention:

1. Elastomeric compositions comprising the reaction product of a conjugated diene synthetic rubber from the group consisting of elastomeric random and block copolymers of styrene and butadiene and cis 1,4 polybutadienes and cis 1,4 polyisoprene, with maleic anhydride, having a bound maleic anhydride content of between 2 and 22% by weight, in which reaction product at least 10% of the bound maleic anhydride is neutralized with one or more mono- and/or poly-tertiary amines, said poly-tertiary amines being from the group consisting of tetra-methylated ethylene diamine and pentamethylated di-ethylene triamine.

2. An elastomeric composition as claimed in claim 1, in which the synthetic rubber is polyisoprene.

3. An elastomeric composition as claimed in claim 1, is which the synethetic rubber is polybutadiene.

4. An elastomeric composition according to claim 1, in which the bound maleic anhydride content is between 7 and 18% by weight.

5. An elastomeric composition according to claim 1, in which at least 50% of the bound maleic anhydride is neutralized with at least one mono- and/or poly-tertiary amine, said poly-tertiary amine being from the group consisting of tetra-methylated ethylene diamine and penta-methylated diethylene triamine.

6. An elastomeric composition according to claim 1, in which the mono-tertiary amine is triethylamine.

7. An elastomeric composition according to claim 1, in which the mono-tertiary amine is tripropylamine.

8. An elastomeric composition according to any one of the preceding claims, in which the mono-tertiary amine is tributylamine.

9. A process of preparing elastomeric compositions according to claim 1, is which the synthetic rubber on the basis of conjugated dienes is reacted with maleic anhydride to give a synethetic rubber-maleic anhydride adduct, and at least 10% of the maleic anhydride is neutralized with at least one mono- or poly-tertiary amine, said poly-tertiary amine being from the group consisting of methylated ethylene diamine and penta-methylated di-ethylene triamine.

References Cited

UNITED STATES PATENTS 2,306,920  12/1942  Weiss _____ 260—78
2,844,502  7/1958   Paxton _____ 161—92
3,316,177  4/1967   Dorer _____ 252—51.5

JOSEPH L. SCHOFER, Primary Examiner

C. A. HENDERSON, Jr., Assistant Examiner

U.S. Cl. X.R.

260—94.7, 45.8, 45.95